(12) United States Patent
Sekar

(10) Patent No.: US 7,941,812 B2
(45) Date of Patent: May 10, 2011

(54) INPUT/OUTPUT VIRTUALIZATION THROUGH OFFLOAD TECHNIQUES

(75) Inventor: Srinivasan Sekar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 11/699,950

(22) Filed: Jan. 30, 2007

(65) Prior Publication Data

US 2008/0184273 A1 Jul. 31, 2008

(51) Int. Cl.
G06F 9/44 (2006.01)
(52) U.S. Cl. .................................... 719/319
(58) Field of Classification Search ............ 719/319
See application file for complete search history.

(56) References Cited

U.S. PATENT DOCUMENTS

| | | | |
|---|---|---|---|
| 6,633,916 B2 | 10/2003 | Kauffman | |
| 6,976,205 B1 * | 12/2005 | Ziai et al. | 714/807 |
| 2005/0120160 A1 * | 6/2005 | Plouffe et al. | 711/1 |
| 2007/0050520 A1 * | 3/2007 | Riley | 709/239 |
| 2007/0174850 A1 * | 7/2007 | El Zur | 719/321 |
| 2007/0186279 A1 * | 8/2007 | Zimmer et al. | 726/9 |
| 2008/0028401 A1 * | 1/2008 | Geisinger | 718/1 |
| 2008/0059644 A1 * | 3/2008 | Bakke et al. | 709/230 |

OTHER PUBLICATIONS

HP Integrity Virtual Machines (Integrity VM), 2007 Hewlett-Packard Development Company, L.P., 2 sheets, [retrieved on Jan. 4, 2007], retrieved from the internet: http://h71028.www7.hp.com/enterprise/cache/262803-0-0-0-121.html.

* cited by examiner

Primary Examiner — Man Phan
Assistant Examiner — Nourali Mansoury

(57) ABSTRACT

A computer apparatus provides support multiple virtual computing machines. In accordance with one embodiment, the computer apparatus includes a platform manager, a virtual machine manager (VMM) driver of the platform manager, a TCP/IP stack of the platform manager, a guest operating system supported by the platform manager, and a TCP offload pseudo driver module of the guest operating system. The VMM driver is configured to transfer data between a top of the TCP/IP stack and the TCP offload pseudo driver module without changing a level of abstraction of the data. In accordance with another embodiment, the VMM driver is configured to transfer data between a top of a SCSI services stack and a SCSI offload pseudo driver module without changing a level of abstraction of the data. Other embodiments, aspects, and features are also disclosed.

24 Claims, 8 Drawing Sheets

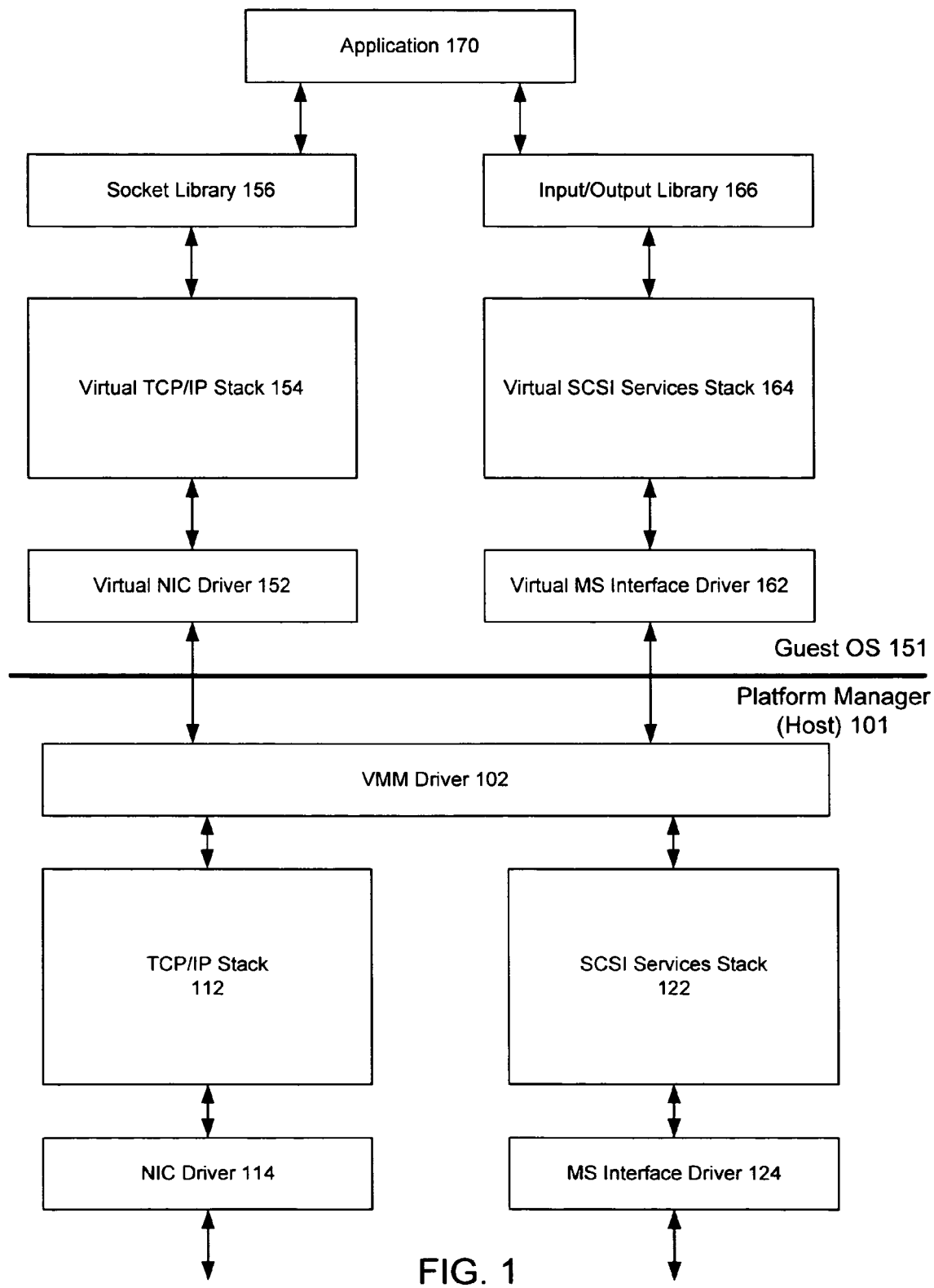
FIG. 1
(Conventional)

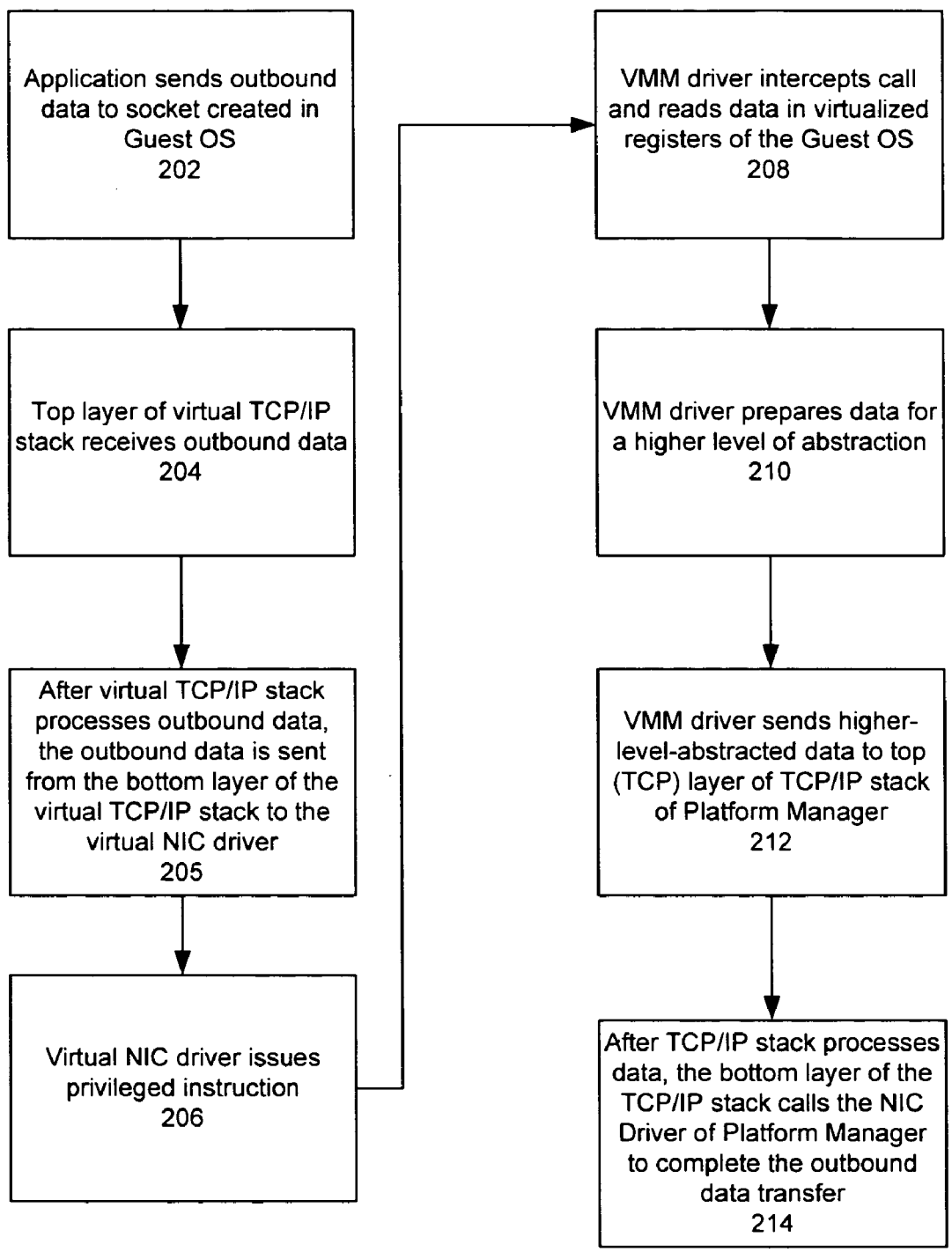
FIG. 2
(Conventional)

INPUT/OUTPUT VIRTUALIZATION THROUGH OFFLOAD TECHNIQUES

BACKGROUND

1. Field of the Invention

The present application relates generally to computer systems.

2. Description of the Background Art

Virtual machines use a single physical computing machine, with one or more physical processors, in combination with software which simulates multiple virtual machines. Each of those virtual machines has, in principle, access to all the physical resources of the underlying real computer. The assignment of resources to each virtual machine is controlled by a platform manager or virtual machine manager(VMM). A typical VMM controls the physical resources of the system and presents a virtualized hardware for each of the virtual machines (also called Guest Operating Systems or Guest OS'es) running on top of it. The VMM intercepts all hardware related instructions from the Guest OS'es and executes the appropriate instructions on the real hardware, after ensuring security and isolation/separation of the Guest OSes from each other, after verifying entitlement and availability of the hardware resource in question for the requesting Guest OS, and doing any mappings from the virtual hardware world to the real hardware as appropriate.

SUMMARY

In accordance with one embodiment, a computer apparatus includes a platform manager configured to support multiple guest operating systems, a virtual machine manager (VMM) driver of the platform manager, a TCP/IP (transmission control protocol/internet protocol) stack of the platform manager, a guest operating system supported by the platform manager, and a TCP offload pseudo driver module of the guest operating system. The VMM driver is configured to transfer data between a top of the TCP/IP stack and the TCP offload pseudo driver module without changing a level of abstraction of the data.

In accordance with another embodiment, the computer apparatus includes a platform manager, a VMM driver of the platform manager, a storage services stack of the platform manager; a guest operating system supported by the platform manager, and a storage offload pseudo driver module of the guest operating system. In this case, the VMM driver is configured to transfer data between a top of the storage services stack and the storage offload pseudo driver module without changing a level of abstraction of the data.

Other embodiments, aspects, and features are also disclosed.

BRIEF DESCRIPTION OF THE DRAWINGS

FIG. 1 is a schematic diagram depicting a conventional virtual machine architecture.

FIG. 2 is a flow chart of a process of sending outbound data from an application using the conventional architecture of FIG. 1.

DETAILED DESCRIPTION

Figure 3A:
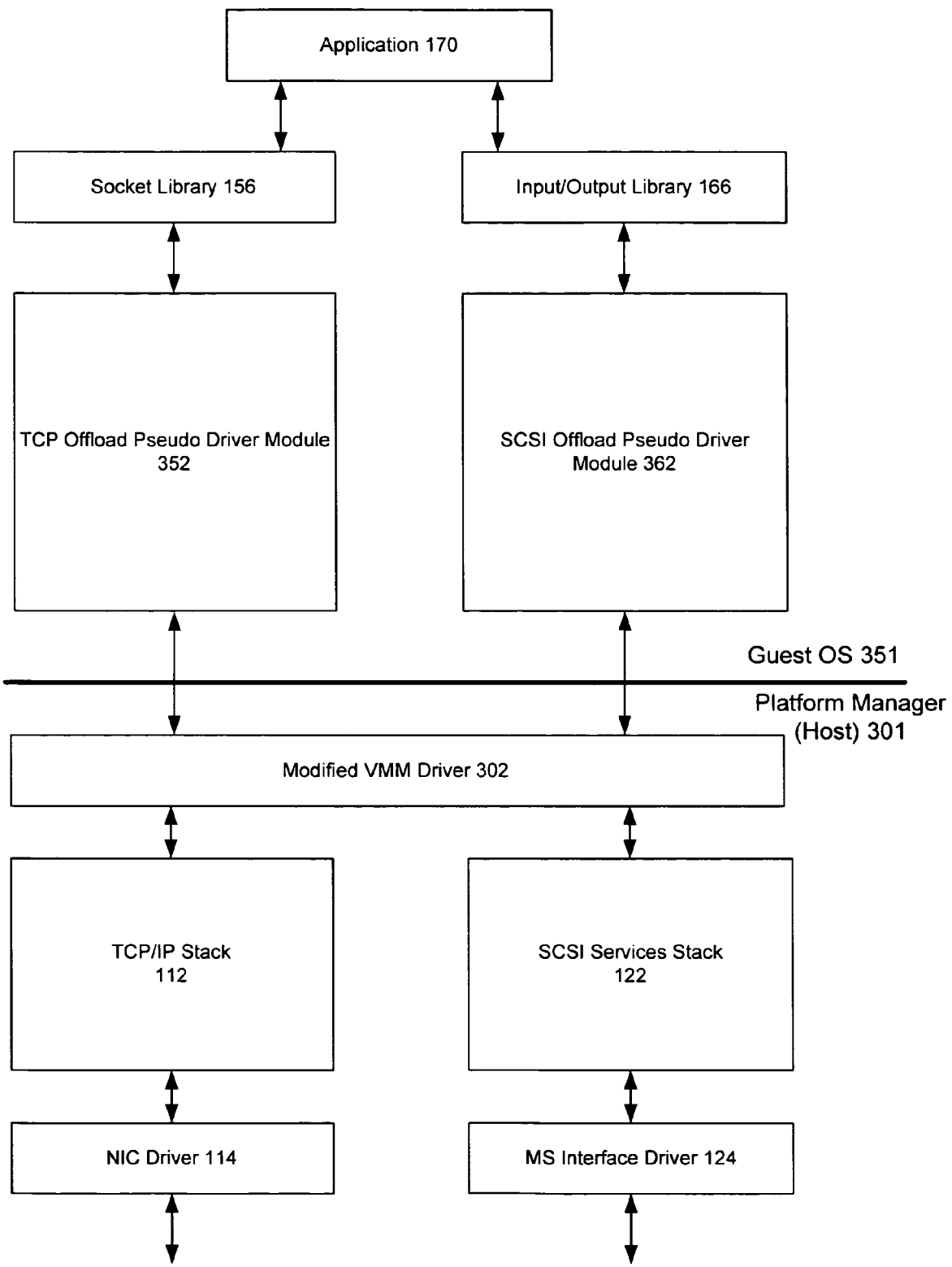
FIGS. 3A and 3B are schematic diagrams depicting a virtual machine architecture in accordance with an embodiment of the invention.

Applicant has discovered a problematic source of inefficiency in input/output transactions in at least some conventional virtual machine architectures. The Applicant has further found a solution to this problem. The solution advantageously improves input/output performance while simplifying implementation. Furthermore, it is readily scalable to new input/output (I/O) cards for both mass storage and networking.

Conventional Virtual Machine Architecture

FIG. 1 is a schematic diagram depicting a conventional virtual machine architecture. The diagram shows select software-implemented components and divides them into those of the Platform Manager (Host Kernel) 101 and those of a guest operating system (Guest OS) 151. These various components may include processor-readable code which is executable to perform various operations and functions.

Although one Guest OS 151 is shown, multiple Guest OS 151 are supportable by the Platform Manager 101 of the virtual machine architecture. Each Guest OS 151 corresponds to a virtual computing machine or virtual processor running in the system.

One component in the Platform Manager 101 is the virtual machine manager (VMM) driver 102. The VMM driver 102 interfaces with the Guest OS 151 of each virtual computing machine running in the system. The VMM driver 102 typically provides kernel-level virtual-machine-related services and implements a context switching mechanism between the host and guest contexts.

The Platform Manager 101 includes other components, such as a TCP/IP stack 112, a network interface card (NIC) driver 114, a SCSI Services stack 122, and MS Interface drivers 124. The TCP/IP stack 112 includes an internet protocol (IP) layer and a transmission control protocol (TCP) layer. The VMM driver 102 interfaces with the top of the TCP/IP stack 112 (i.e. with the TCP layer) and the top of the SCSI Services stack 122. The bottom of the TCP/IP stack 112 (i.e. the IP layer) interfaces with the NIC driver 114, and the NIC driver 114 interfaces with a network (not shown). The SCSI Services stack 122 interfaces with the MS interface drivers 124, and the MS interface drivers 124 interface with a storage system (not shown).

Components of the Guest OS 151 include a virtual NIC driver 152, a virtual TCP/IP stack 154, a socket library 156, virtual MS interface drivers 162, a virtual SCSI Services stack 164, an input/output library 166, and one or more applications 170. The virtual NIC driver 152 and the virtual MS interface drivers 162 interface with the VMM driver 102 of the Platform Manager 101. The virtual NIC driver 152 interfaces with the bottom of the virtual TCP/IP stack 154 (i.e. the virtual IP layer), and the virtual MS interface drivers 162 interface with the bottom of the virtual SCSI Services stack 164. The top of the virtual TCP/IP stack 154 (i.e. the virtual TCP layer) interfaces with the socket library 156, and the top of the virtual SCSI Services stack 164 interfaces with the input/output library 166. The application 170 communicates input/output data using functions of the socket library 156 and the input/output library 166.

The conventional architecture discussed above in relation to FIG. 1 is configured to provide input/output support for multiple virtual computing machines running on a single physical system. An example of a method of operation using the conventional architecture is discussed below in relation to FIG. 2. While this conventional architecture and method of operation works, applicant has identified a problematic inefficiency in the method. In particular, the I/O data is twice processed by a TCP/IP stack, a first time by the virtual TCP/IP stack of the Guest OS and a second time by the TCP/IP stack of the Kernel.

FIG. 2 is a flow chart of a process of sending outbound data from an application 170 using the conventional architecture of FIG. 1. The application 170 sends 202 outbound data to a socket (created using socket library 156) in the Guest OS 151. The outbound data is received 204 at the top (TCP) layer of the virtual TCP/IP stack 154. After processing of the data by the virtual TCP/IP stack 154, the outbound data is sent 205 from the bottom (IP) layer of the virtual TCP/IP stack 154 to the virtual NIC driver 152. The virtual NIC driver then issues 206 a call to send the outbound data to a network. The call is privileged in that it relates to accessing a physical resource which is controlled by the Platform Manager 101.

The VMM driver 102 intercepts 208 the call and reads data in virtualized registers of the Guest OS 151. The VMM driver 102 then prepares 210 data for a higher level of abstraction (i.e. for a TCP layer) and sends 212 the higher-level-abstracted data to the top (TCP) layer of the TCP/IP stack 112 of the Platform Manager 101. After the TCP/IP stack 112 processes the data, the bottom (IP) layer of the TCP/IP stack calls 214 the NIC Driver 114 of Platform Manager 101 to complete the outbound data transfer.

Problematic issues with the above traditional architecture may be summarized as follows:

1. The Guest OS assumes that the virtualized hardware card (for example, a virtual Network Interface Card, also known as a vNIC, and a virtual SCSI card, also known as a vSCSI) is a real card and the appropriate driver processes the data from upper layers (the TCP stack for vNIC and the SCSI Stack for vSCSI). However, the virtualized hardware card could have the same hardware programming interface as the real cards, or could have a different programming interface as the real cards; for example, the real NIC could be based on Intel chip while the vNIC could be having a Broadcom chip programming interface. Therefore, at the point of doing DMA transfer of the data in the queue, the VMM driver intercepts this call, and then interprets the registers of the vNIC memory locations, accesses the data buffer from the Guest OS and re-maps the buffer addresses to a physical address in the VMM address space, does other verifications such as availability and entitlement, etc., and then changes the control data for it to be processed once again by the upper layers (TCP and SCSI stacks). This results in duplicate processing, numerous context switches and additional instructions to modify control data from lower layers to higher layers. The processing overhead in most cases is significant enough to impact I/O performance very detrimentally.
2. When I/O bound applications run on Guest OSes, due to the above complexities, the architecture does not scale well, and hence has limited applicability for select workloads in its current form.
3. Due to the complexities in context switching among different address spaces, the implementation in the above architecture is quite complex. When additional concepts such as port aggregation and virtual LANs, in case of networking technologies, and multi-pathing and device addressing in case of storage technologies, are added to the mix, the complexity of implementation and usage in this conventional architecture could lead to numerous deployment issues in complex use cases.

New Architecture

FIG. 3A is a schematic diagram depicting a virtual machine architecture in accordance with an embodiment of the invention. The diagram shows select software-implemented components and divides them into those of the Platform Manager (Host Kernel) 301 and those of a guest operating system (Guest OS) 351. These various components may include processor-readable code which is executable to perform various operations and functions.

Although one Guest OS 351 is shown, multiple Guest OS 351 are supportable by the Platform Manager 301 of the virtual machine architecture. Each Guest OS 351 corresponds to a virtual computing machine or virtual processor running in the system. For example, FIG. 3B shows three guest operating systems (Guest OS 351A, Guest OS 351B, and Guest OS 351C) supported by the Platform Manager 301 of the virtual machine architecture.

Components in the Platform Manager 301 include a modified VMM driver 302, a TCP/IP stack 112, a network interface card (NIC) driver 114, a SCSI Services stack 122, and MS Interface drivers 124. The VMM driver 102 interfaces with the Guest OS 351 of each virtual computing machine running in the system. The modified VMM driver 302 provides kernel-level virtual-machine-related services and implements a context switching mechanism between the host and guest contexts. The TCP/IP stack 112 includes an internet protocol (IP) layer and a transmission control protocol (TCP) layer. The modified VMM driver 302 interfaces with the top of the TCP/IP stack 112 (i.e. with the TCP layer) and the top of the SCSI Services stack 122. The bottom of the TCP/IP stack 112 (i.e. the IP layer) interfaces with the NIC driver 114, and the NIC driver 114 interfaces with a network (not shown). The SCSI Services stack 122 interfaces with the MS interface drivers 124, and the MS interface drivers 124 interface with a storage system (not shown).

Components of the Guest OS 351 include a TCP Offload Pseudo Driver Module 352, a socket library 156, a SCSI Offload Pseudo Driver Module 362, an input/output library 166, and one or more applications 170. An application 170 communicates input/output data using functions of the socket library 156 and the input/output library 166. The TCP Offload Pseudo Driver Module 352 interfaces with the socket library 156, and the SCSI Offload Pseudo Driver Module 362 interfaces with the input/output library 166. Advantageously, no virtual NIC driver 152 and no virtual MS interface drivers 162 are necessarily required. Furthermore, no virtual TCP/IP stack 154 and no virtual SCSI Services stack 164 are necessarily required.

Figure 3B:
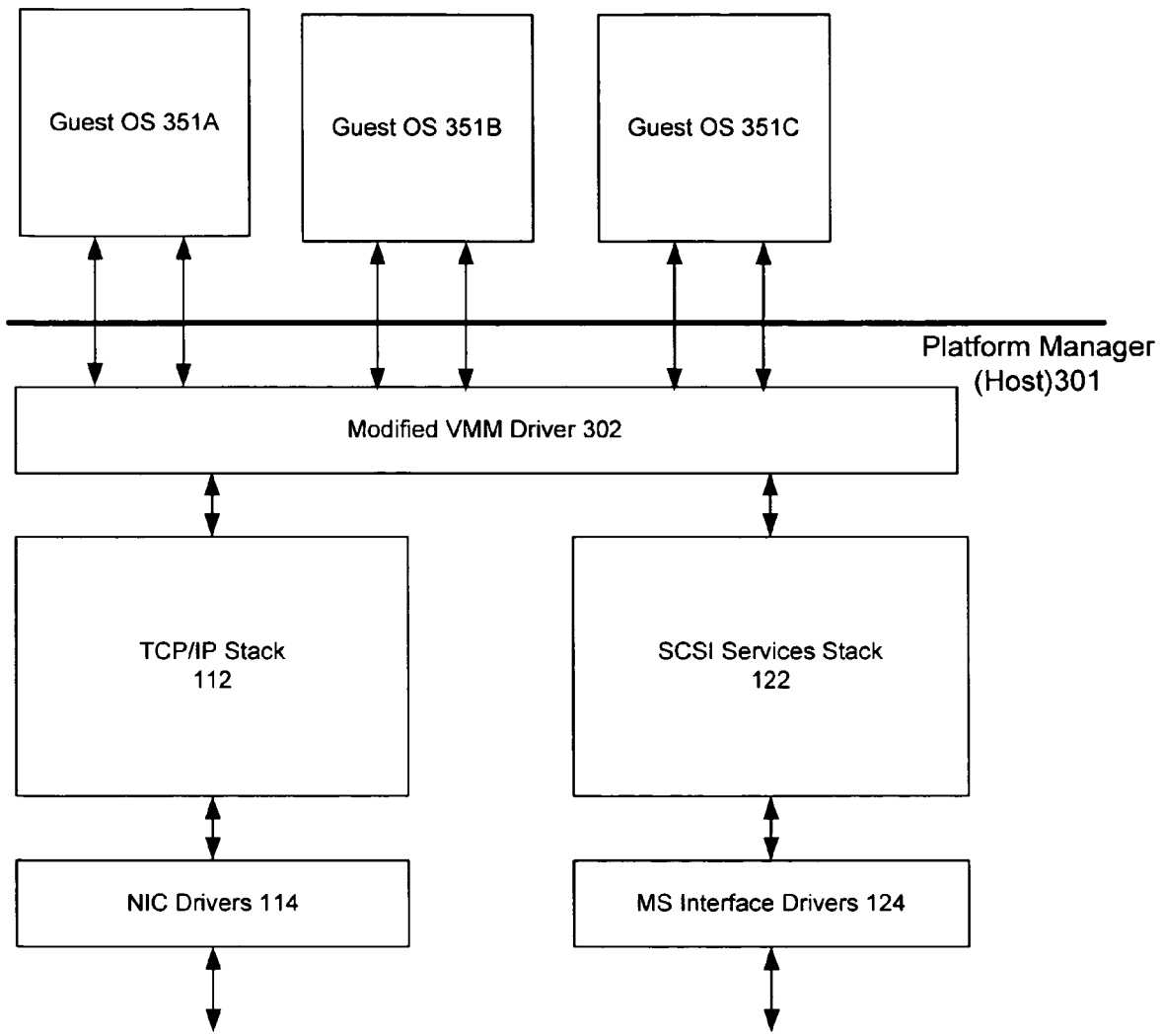
Figure 4:
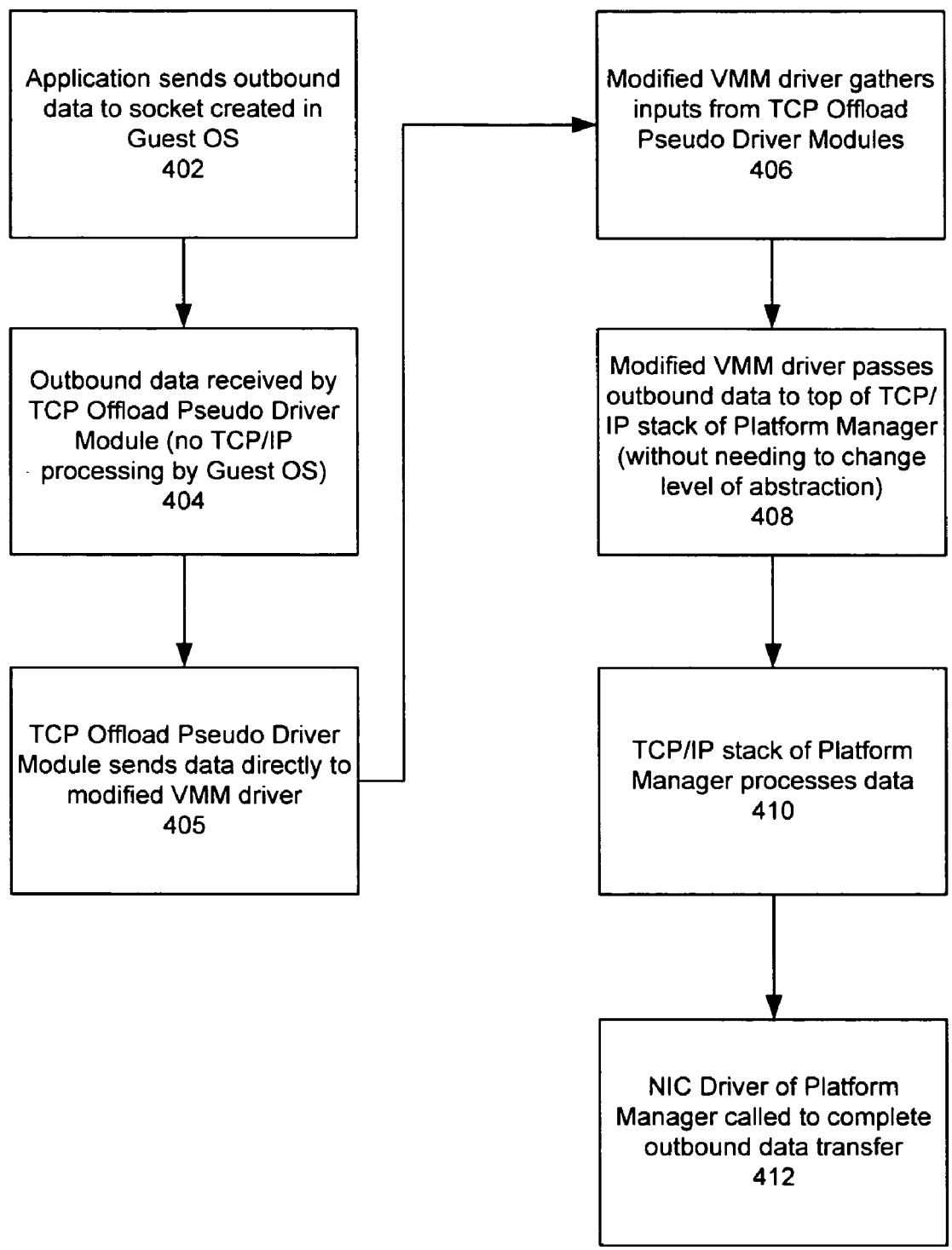
FIG. 4 is a flow chart of a process of sending outbound networking data in accordance with an embodiment of the invention.

FIG. 4 is a flow chart of a process of sending outbound networking data using the architecture of FIGS. 3A and 3B in accordance with an embodiment of the invention. The application 170 sends 402 outbound data to a socket (created using socket library 156) in the Guest OS 351. The outbound data is received 404 by the TCP Offload Pseudo Driver Module 352.

The TCP Offload Pseudo Driver Module 352 sends 405 the data directly to the modified VMM driver 302 without going through a virtual NIC driver 152. Advantageously, no TCP/IP processing is performed by the Guest OS 351. In one implementation, the TCP Offload Pseudo Driver Module 352 may advantageously use a same interface as used for a hardware TCP Offload Engine. Such a hardware TCP Offload Engine utilizes a controller which is separate from the main host microprocessor to improve TCP/IP performance.

The modified VMM driver 302 gathers 406 inputs (i.e. requests for outbound data transfer) from the TCP Offload Pseudo Driver Modules 352 of the various guest operating systems 351. These requests for outbound data transfer via the TCP/IP protocol are thus automatically consolidated by the modified VMM driver 302.

The modified VMM driver 302 passes 408 the outbound data to the top of the TCP/IP stack 112 of the Platform Manager 301. Advantageously, there is no need to change the level of abstraction of the data. After the TCP/IP stack 112 processes 410 the data, the NIC Driver 114 of the Platform Manager 301 is called 412 to complete the outbound data transfer.

Figure 5:
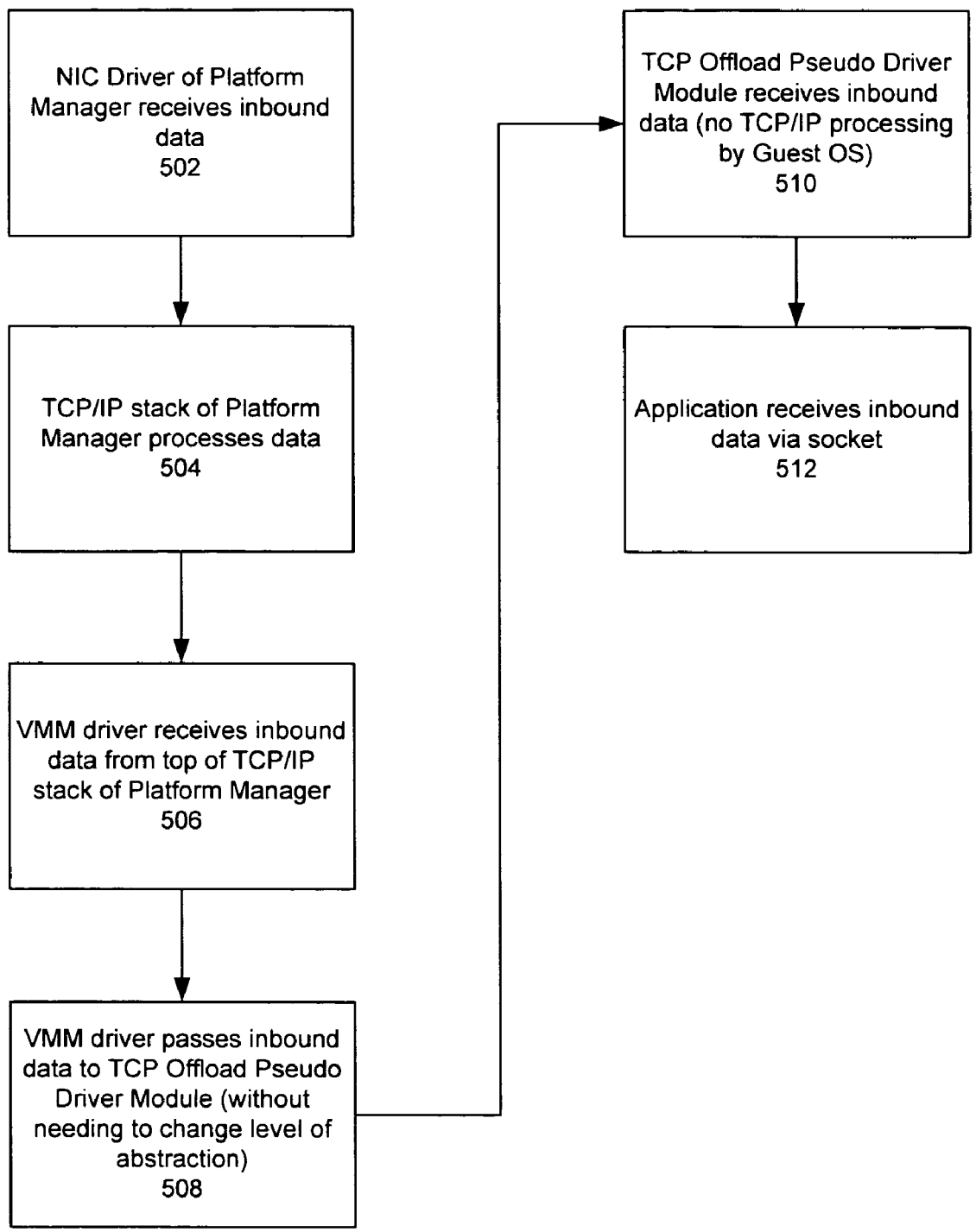
FIG. 5 is a flow chart of a process of receiving inbound networking data in accordance with an embodiment of the invention.

FIG. 5 is a flow chart of a process of receiving inbound networking data using the architecture of FIGS. 3A and 3B in accordance with an embodiment of the invention. The NIC Driver 114 of the Platform Manager 301 receives 502 an inbound data transfer. The inbound data transfer may be destined for an application in any one of the various Guest OS 351 running on top of the Platform Manager 301.

The TCP/IP stack 112 of the Platform Manager 301 processes 504 the data, and the modified VMM driver 302 receives 506 the inbound data to the top of the TCP/IP stack 112 of the Platform Manager 301. The modified VMM driver 302 passes 508 the inbound data directly to the TCP Offload Pseudo Driver Module 352 without going through a virtual NIC driver 152. Advantageously, there is no need for the modified VMM driver 302 to change the level of abstraction of the data. In contrast, such a change in the level of abstraction is necessary in the conventional architecture shown in FIG. 1.

The TCP Offload Pseudo Driver Module 352 receives 510 the inbound data. Advantageously, no TCP/IP processing is performed by the TCP Offload Pseudo Driver Module 352. In contrast, such TCP/IP processing is performed by the virtual TCP/IP stack in the conventional architecture shown in FIG. 1. Finally, the application 170 receives 512 the inbound data via a socket (created using socket library 156) in the Guest OS 351.

Figure 6:
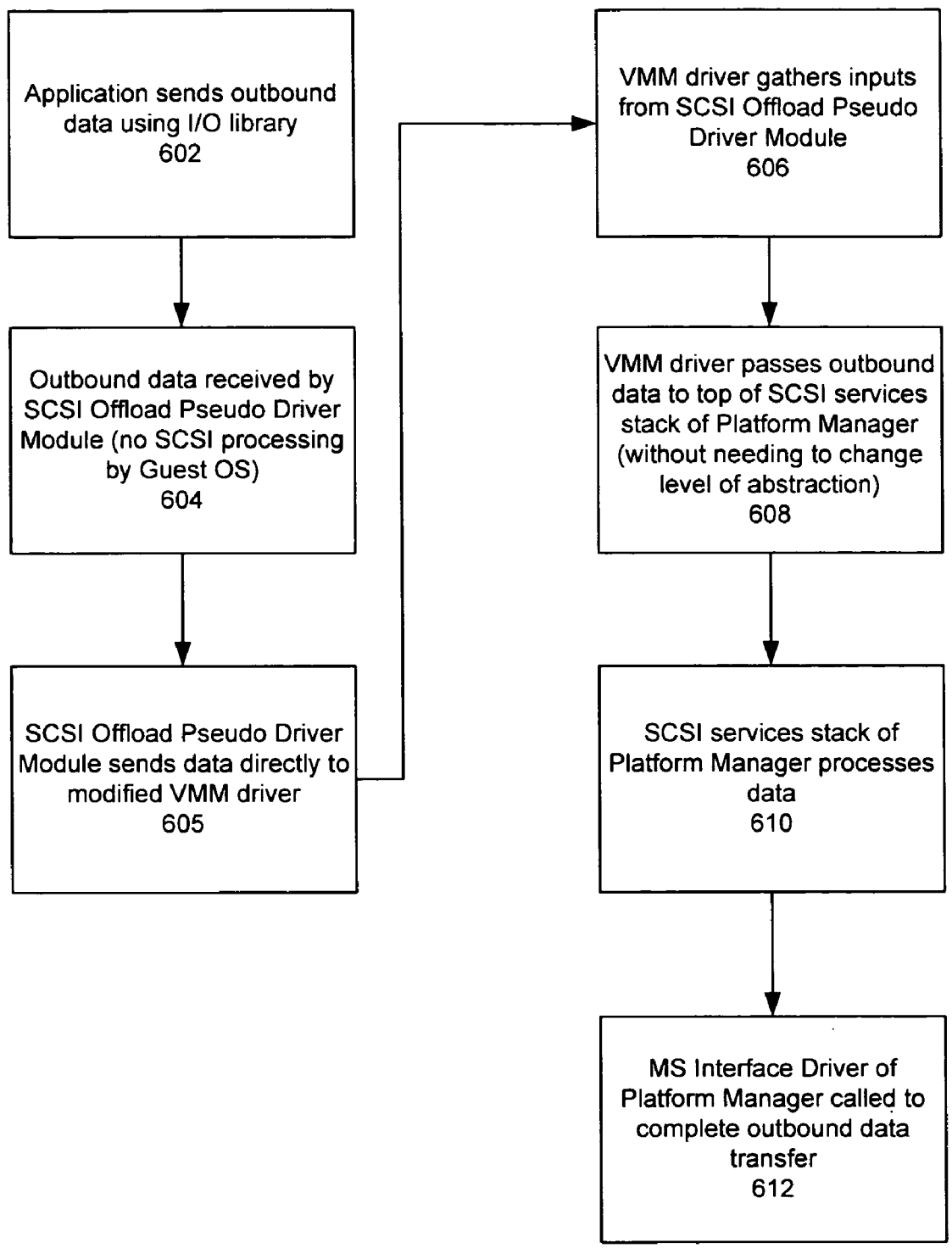
FIG. 6 is a flow chart of a process of sending outbound data to a data storage system in accordance with an embodiment of the invention.

FIG. 6 is a flow chart of a process of sending outbound data to a data storage system using the architecture of FIGS. 3A and 3B in accordance with an embodiment of the invention. The application 170 sends 602 the outbound data to the data storage system using the I/O library 166. Consider, for example, that the data storage system is a direct attach SCSI storage system. In other embodiments of the invention, other data storage systems may be used, such as using Fiber Channel or various other technologies. In the case of a SCSI system, the outbound data is received 604 by the SCSI Offload Pseudo Driver Module 362.

The SCSI Offload Pseudo Driver Module 362 sends 605 the data directly to the modified VMM driver 302 without going through a virtual MS Interface driver 162. Advantageously, no SCSI processing is performed by the Guest OS 351.

The modified VMM driver 302 gathers 606 inputs (i.e. requests for outbound data transfer) from the SCSI Offload Pseudo Driver Modules 362 of the various guest operating systems 351. These requests for outbound data transfer to the storage system are thus automatically consolidated by the modified VMM driver 302.

The modified VMM driver 302 passes 608 the outbound data to the top of the SCSI Services stack 122 of the Platform Manager 301. Advantageously, there is no need to change the level of abstraction of the data. After the SCSI Services stack 122 processes 610 the data, the MS Interface Drivers 124 of the Platform Manager 301 is called 612 to complete the outbound data transfer.

Figure 7:
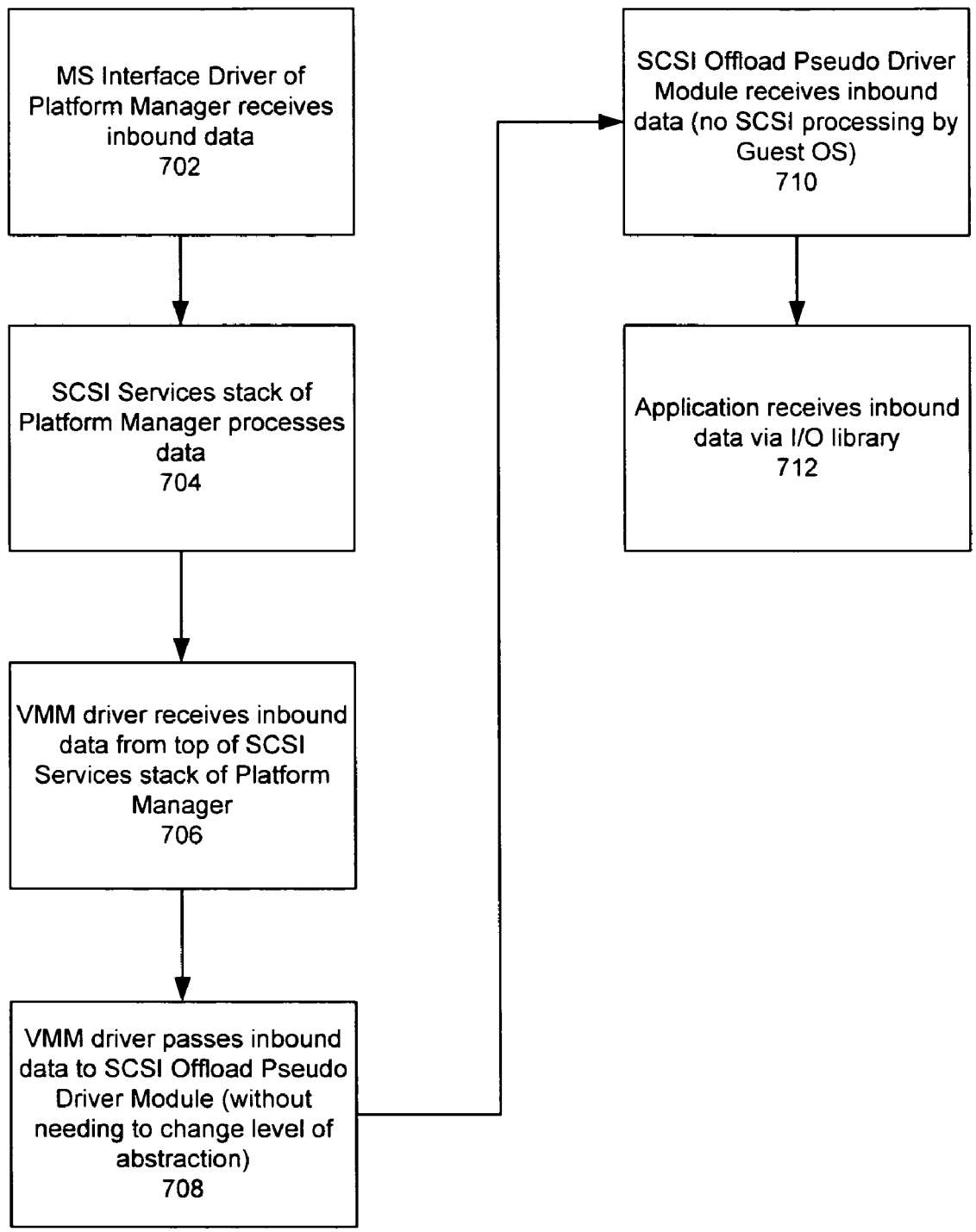
FIG. 7 is a flow chart of a process of receiving inbound data from a data storage system in accordance with an embodiment of the invention.

FIG. 7 is a flow chart of a process of receiving inbound data from a data storage system using the architecture of FIGS. 3A and 3B in accordance with an embodiment of the invention. The MS Interface Driver 124 of the Platform Manager 301 receives 702 an inbound data transfer. The inbound data transfer may be destined for an application in any one of the various Guest OS 351 running on top of the Platform Manager 301.

The SCSI Services stack 122 of the Platform Manager 301 processes 704 the data, and the modified VMM driver 302 receives 706 the inbound data to the top of the SCSI Services stack 122 of the Platform Manager 301. The modified VMM driver 302 passes 708 the inbound data directly to the SCSI Offload Pseudo Driver Module 362 without going through a virtual MS Interface driver 162. Advantageously, there is no need for the modified VMM driver 302 to change the level of abstraction of the data. In contrast, such a change in the level of abstraction is necessary in the conventional architecture shown in FIG. 1.

The SCSI Offload Pseudo Driver Module 362 receives 710 the inbound data. Advantageously, no SCSI processing is performed by the SCSI Offload Pseudo Driver Module 362. In contrast, such SCSI processing is performed by the virtual SCSI Services stack in the conventional architecture shown in FIG. 1. Finally, the application 170 receives 712 the inbound data via the I/O library 166 in the Guest OS 351.

CONCLUSION

Applicant has discovered bottlenecks and inefficiencies in input/output transactions in at least some conventional virtual machine architectures. A conventional architecture has the guest OS process input/output at the interface driver level, and when the interface driver in the guest OS tries to issue a privileged instruction (such as initiating a direct memory access), the platform manager operating system intercepts the call. The VMM sub-system (i.e. the VMM driver) in the platform manager then reads the data in the virtualized registers from the guest OS, prepares the data to a higher level of abstraction (DLPI driver level for networking, and SCSI services layer for mass storage) and calls the appropriate driver in the platform manager to complete the input/output (after mapping the virtual I/O to the appropriate device). Similarly, when the platform manager receives any I/O interrupts from a hardware I/O card, the VMM sub-system issues a corresponding interrupt to the guest OS driver which then processes the interrupt as though it occurred from a real I/O device.

In both the outbound and the inbound paths for a conventional architecture, there are several performance bottlenecks and inefficiencies which add to I/O performance overheads. The bottlenecks and inefficiencies may include context-switching for every low level I/O call from the guest to host (platform manager), copying of the buffers, marshalling low level data into higher level data, dual stack processing (DLPI for networking and SCSI Services for mass storage I/O), and dual interrupt processing (both at host and guest for every low level interrupt from any I/O device meant for a guest). These bottlenecks and inefficiencies may be significant for heavy I/O workloads.

The present application discloses a solution to the above-discussed bottlenecks and inefficiencies. The solution involves input/output virtualization through offload techniques. The solution advantageously improves input/output performance while simplifying implementation. Furthermore, it is readily scalable to new I/O cards for both mass storage and networking.

For networking, the guest OS uses a TCP Offload Engine (TOE) interface and assumes a virtual hardware TOE card. In the outbound path, the guest OS offloads the I/O to the platform manager at the top of the TCP/IP stack itself (i.e. no TCP/IP processing in the guest OS). The VMM sub-system then gathers the data inputs from the TOE pseudo driver in the guest OS, and passes the data to the host TCP stack for further processing on the outbound. Similarly, in the inbound path, all NIC-level interrupts are completely consumed by the host (platform manager), and only after the entire TCP packet is received and processes will the host issue a soft-interrupt to the Guest OS for the TOE pseudo driver to receive the TCP packet and pass it on to applications.

For data storage, a similar SCSI offload pseudo driver in the guest OS may be configured to assume virtual SCSI services offload hardware. In the outbound path, the guest OS offloads the I/O to the platform manager at the top of the SCSI services stack (without doing SCSI services processing in the guest OS). This is done by a call from the SCSI offload pseudo driver to the virtual SCSI services offload hardware. This call is intercepted by the VMM sub-system in the platform manager. The VMM sub-system passes the intercepted data to the SCSI services stack in the host for normal processing. In the inbound path, the host interface drivers and the SCSI services stack do all the low-level processing, and when the data is ready for passing to the upper layers above SCSI services, then the platform manager issues a soft interrupt to the guest operating system, where the interrupt service routine (ISR) of the SCSI offload pseudo driver takes the data and passes it on to the guest applications (without doing SCSI services processing).

There are several advantages to the solution disclosed herein. First, for both networking and mass storage, the guest-to-host transition for input/output occurs at a very high level (above TCP/IP and SCSI services stacks). This will generally reduce the number of such transitions because the packet sizes at these higher levels could be and typically are much larger than at lower levels. For outbound data, these larger packets may be broken up into smaller packets by the host OS before the actual input/output, and so there is no per-packet overhead at the lowest levels as in the conventional architecture. Similarly, for inbound data, several hardware level interrupts are completely handled and consumed by the host OS, with the guest OS seeing a single interrupt after higher-level data is ready to be delivered.

In addition, the native operating system's interfaces for TCP offload and for plugging modules above SCSI services may be re-used to insert the pseudo-drivers. This same mechanism may be used for a variety of NIC cards in the host, as well as for a variety of mass storage host bus adaptors (HBAs) and technologies (for example, fiber channel, SCSI, serial attached SCSI (SAS), and so on).

Furthermore, newer cards in the host may be automatically supported in the guest operating system with no further modification or qualification because the guest operating system is abstracted from link level technologies due to higher level offloading. Also, as new performance enhancements are introduced into the platform manager operating system, these enhancements may be seen automatically in the various guest operating systems without modifying the guest operating systems. For example, the introduction of a more efficient SCSI services stack in the host would benefit various guests (for example, an HP-UX guest, a Windows guest, and a Linux guest) without further modification of those guest operating systems.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

Recently, other competitive approaches have been used to solve the problem of I/O inefficiencies. One approach, called Direct I/O, maps the virtual hardware (vNIC and vSCSI) directly to a real hardware (NIC and SCSI/FC) in the VMM module. The VMM driver upon intercepting hardware calls in the Guest OS will map the calls directly to the Platform Manager's drivers controlling real hardware and bypasses the upper layer stacks in the Platform Manager (such as the TCP stack and SCSI stack). While on the I/O front, this approach has the same advantage as the implementation disclosed in this patent application, the biggest disadvantage to Direct I/O approach is that the real hardware can no longer be virtualized among many different Guest OSes. In other words, each Guest OS will now need to have its own real hardware, which removes all virtualization of I/O for such hardware resources. The architecture described in the present disclosure eliminates the I/O issues in the conventional architecture while still retaining virtualization of I/O resources, unlike the alternate approach pursued in Direct I/O.

What is claimed is:

1. An apparatus to provide support for multiple virtual computing machines, the apparatus comprising:
   a platform manager configured to support multiple guest operating systems;
   a virtual machine manager (VMM) driver of the platform manager;
   a TCP/IP (transmission control protocol/internet protocol) stack of the platform manager, wherein the VMM driver interfaces a top of the TCP/IP stack;
   a first guest operating system supported by the platform manager; and
   a TCP (transmission control protocol) offload pseudo driver module of the first guest operating system, wherein the TCP offload pseudo driver module is to pass data between a component of the first guest operating system and the VMM driver,
   wherein the VMM driver is configured to transfer the data between the top of the TCP/IP stack and the TCP offload pseudo driver module of the first guest operating system without changing a level of abstraction of the data.

2. The apparatus of claim 1, wherein the TCP/IP stack is configured to perform TCP/IP processing that is not performed by the TCP offload pseudo driver module of the first guest operating system.

3. The apparatus of claim 1, wherein the data comprises outbound data to a network, and the TCP offload pseudo driver module is configured to receive the outbound data from an application via a socket created in the first guest operating system.

4. The apparatus of claim 1, wherein the data comprises inbound data from a network, and the TCP offload pseudo driver module is configured to send the inbound data to an application via a socket created in the first guest operating system.

5. An apparatus to provide support for multiple virtual computing machines, the apparatus comprising:
   a platform manager configured to support multiple guest operating systems;
   a virtual machine manager (VMM) driver of the platform manager;
   a storage services stack of the platform manager, wherein the VMM driver interfaces a top of the storage services stack;
   a first guest operating system supported by the platform manager; and
   a storage offload pseudo driver module of the first guest operating system, wherein the storage offload pseudo driver module is to pass data between a component of the first guest operating system and the VMM driver,
   wherein the VMM driver is configured to transfer the data between the top of the storage services stack and the storage offload pseudo driver module of the first guest operating system without changing a level of abstraction of the data.

6. The apparatus of claim 5, wherein the storage services stack is configured to perform storage services processing that is not performed by the storage offload pseudo driver module of the first guest operating system.

7. The apparatus of claim 5, wherein the data comprises outbound data to a storage system, and the storage offload pseudo driver module is configured to receive the outbound data from an application using an input/output library.

8. The apparatus of claim 5, wherein the data comprises inbound data from a storage system, and the storage offload pseudo driver module is configured to send the inbound data to an application using an input/output library.

9. The apparatus of claim 5, wherein the storage services stack comprises a small computer system interface (SCSI) services stack.

10. A method of input/output virtualization, the method comprising:
    transferring, in a computer, data between a top of a TCP/IP stack of a platform manager and a TCP offload pseudo driver module of a particular guest operating system using a virtual machine manager (VMM) driver without changing a level of abstraction of the data, wherein the platform manager is configured to support multiple guest operating systems, wherein the VMM driver interfaces the top of the TCP/IP stack; and
    passing, by the TCP offload pseudo driver module, the data between a component of the particular guest operating system and the VMM driver.

11. The method of claim 10, further comprising performing TCP/IP processing that is not performed by the TCP offload pseudo driver module of the particular guest operating system.

12. The method of claim 10, wherein the data comprises outbound data to a network, the method further comprising:
    creating a socket in the particular guest operating system; and
    receiving the outbound data by the TCP offload pseudo driver module from an application via the socket.

13. The method of claim 10, wherein the data comprises inbound data from a network, further comprising:
    creating a socket in the particular guest operating system; and
    sending the inbound data by the TCP offload pseudo driver module to an application via the socket.

14. A method of input/output virtualization, the method comprising:
    transferring, in a computer, data between a top of a storage services stack of a platform manager and a storage offload pseudo driver module of a particular guest operating system using a virtual machine manager (VMM) driver without changing a level of abstraction of the data, wherein the platform manager is configured to support multiple guest operating systems, wherein the VMM driver interfaces the top of the storage services stack; and
    passing, by the storage offload pseudo driver module, the data between a component of the particular guest operating system and the VMM driver.

15. The method of claim 14, further comprising performing storage services processing that is not performed by the storage offload pseudo driver module of the particular guest operating system.

16. The method of claim 14, wherein the data comprises outbound data to a storage system, further comprising:
    receiving the outbound data by the storage offload pseudo driver module from an application by way of an input/output library.

17. The method of claim 14, wherein the data comprises inbound data from a storage system, further comprising:
    sending the inbound data by the storage offload pseudo driver module to an application by way of an input/output library.

18. The method of claim 14, wherein the storage services stack comprises a small computer system interface (SCSI) services stack.

19. The apparatus of claim 1, wherein the VMM driver is configured to transfer the data without changing the level of abstraction of the data due to the apparatus not providing a virtual TCP/IP stack and a virtual network driver in the first guest operating system such that the data is transferred directly between the TCP offload pseudo driver module and the VMM driver.

20. The apparatus of claim 1, wherein the VMM driver transferring the data without changing the level of abstraction of the data comprises transferring the data without changing between data of a lower level layer and data of a higher level layer.

21. The apparatus of claim 5, wherein the VMM driver transferring the data without changing the level of abstraction of the data comprises transferring the data without changing between data of a lower level layer and data of a higher level layer.

22. The method of claim 10, wherein the VMM driver is configured to transfer the data without changing the level of abstraction of the data due to the computer not providing a virtual TCP/IP stack and a virtual network driver in the guest operating system such that the data is transferred directly between the TCP offload pseudo driver module and the VMM driver.

23. The method of claim 10, wherein the transferring the data without changing the level of abstraction of the data comprises transferring the data without changing between data of a lower level layer and data of a higher level layer.

24. The method of claim 14, wherein the transferring the data without changing the level of abstraction of the data comprises transferring the data without changing between data of a lower level layer and data of a higher level layer.

* * * * *